US010110726B2

(12) United States Patent
Aaron et al.

(10) Patent No.: US 10,110,726 B2
(45) Date of Patent: Oct. 23, 2018

(54) RAPID SERIAL VISUAL PRESENTATION TO DELIVER MESSAGES IN SOCIAL SPACES

(71) Applicant: International Business Machines Corporation, Armonk, NY (US)

(72) Inventors: Andrew S. Aaron, Ardsley, NY (US); Joel W. Branch, Hamden, CT (US); Dario Gil, Katonah, NY (US); Jonathan Lenchner, North Salem, NY (US); John C. Nelson, Newtown, CT (US)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 14/736,573

(22) Filed: Jun. 11, 2015

(65) Prior Publication Data

US 2016/0366268 A1 Dec. 15, 2016

(51) Int. Cl.
*G06F 15/173* (2006.01)
*H04M 1/725* (2006.01)
*H04L 12/58* (2006.01)

(52) U.S. Cl.
CPC ...... *H04M 1/72552* (2013.01); *H04L 51/063* (2013.01); *H04L 51/20* (2013.01); *H04L 51/32* (2013.01); *H04M 1/7253* (2013.01)

(58) Field of Classification Search
CPC ......... G06F 3/013; G06F 3/012; H04L 51/14; H04M 1/72552
See application file for complete search history.

(56) References Cited

U.S. PATENT DOCUMENTS

| 8,438,228 | B1 | 5/2013 | Gunasekara | |
|---|---|---|---|---|
| 2004/0093566 | A1* | 5/2004 | McElligott | G06Q 10/107 715/255 |
| 2006/0093998 | A1* | 5/2006 | Vertegaal | G06F 3/011 434/236 |
| 2009/0023395 | A1* | 1/2009 | Chang | G06F 13/102 455/74.1 |
| 2011/0281568 | A1* | 11/2011 | Le Clech | H04M 1/575 455/415 |
| 2014/0189515 | A1* | 7/2014 | Waldman | G06F 3/01 715/719 |

(Continued)

OTHER PUBLICATIONS

Mell et al., "The NIST Definition of Cloud Computing", National Institute of Standards and Technology, U.S. Department of Commerce, Special Publication 800-145, Sep. 2011. 7 pages.

(Continued)

*Primary Examiner* — Arvin Eskandarnia
*Assistant Examiner* — Austin Moreau
(74) *Attorney, Agent, or Firm* — Laura E. Gisler (57) ABSTRACT

A private message can be delivered by a computer system to a user in an environment, using a display in the environment, a user device, and sensors in the space. The device is detected and connected to a system once it enters a space. A private message is directed to the device and it is received by the system, which notifies the device that the message has been received. The user can then look up at a device to display the message and the system can determine where the user is looking, in order to deliver the message using rapid serial visual presentation to the user on the display device.

20 Claims, 9 Drawing Sheets

(56) References Cited

U.S. PATENT DOCUMENTS

| | | | |
|---|---|---|---|
| 2015/0015608 A1 | 1/2015 | Park | |
| 2016/0012475 A1* | 1/2016 | Liu | G06F 3/013 705/14.49 |
| 2016/0037337 A1* | 2/2016 | Elliott | H04W 12/06 713/168 |

OTHER PUBLICATIONS

Unknown, "Splitview", Mercedes-Benz, © 2015 Daimler AG. All rights reserved. 5 pages. http://techcenter.mercedes-benz.com/en/splitview/detail.html.

Wikipedia, "Rapid serial visual presentation", Wikipedia the Free Encyclopedia, last modified Dec. 24, 2014. 6 pages. http://en.wikipedia.org/wiki/Rapid_serial_visual_presentation.

\* cited by examiner

RAPID SERIAL VISUAL PRESENTATION TO DELIVER MESSAGES IN SOCIAL SPACES

BACKGROUND

The present disclosure relates to computer systems, more particular aspects relate to delivery of messages using computer systems.

Text messaging or "texting", may involve composing and sending brief, electronic messages between two or more mobile phones, or fixed or portable devices over a network. Text messages can be used to interact with automated systems to, for example, order products or services, or to participate in contests.

Rapid serial visual presentation (RSVP) may be used to display text to a viewer. When RSVP technology is used to display text, a viewer of the text may see a sequence of words displayed in the same space at a rapid rate, one after the other. In some cases, more than one word may be shown at a time, especially if the words are of sufficiently short total length.

SUMMARY

Embodiments of the present disclosure may be directed toward a method for delivering a private message to a user associated with a network enabled device in an environment, when the environment has a sensing apparatus and a second device. The system can detect a device is in the environment and connect the device to the system. The system can receive a private message directed to the device. The system can receive data from a sensing apparatus, where the data indicates the location of a fixed visual focus for a user and determine the location of the fixed visual focus of the user from the data. Based on the location, the system can send the message to the second device. The second device can be configured to user rapid serial visual presentation technology.

Embodiments of the present disclosure may be directed toward a computer system for delivering a private message to a user associated with a network enabled device in an environment. The environment may be equipped with a sensing apparatus and a second device. The system can comprise at least one computer processor circuit. The circuit can comprise a receiving module configured to detect the device in the environment and connect the device to the system. The module can then receive a private message that was directed to the device. A determining module can be configured to receive data from the sensing apparatus. The data can indicate the location of a fixed visual focus of the user, and it can determine a location of the fixed visual focus of the user. The circuit can also have a transmitting module that can send the message to the second device, based on the location of the fixed visual focus of the user. The second device can be configured to use rapid serial visual presentation.

Embodiments of the present disclosure may be directed toward a computer program product for delivering a private message to a user associated with a network enabled device in an environment. The environment may have a sensing apparatus and a second device. The computer program product may comprise a computer readable storage medium having program instructions and where the computer storage medium is not a transitory signal per se. The program instructions can cause the circuit to perform a method that includes detecting the device in the environment and connecting the device to a computer system. The system can receive a private message directed to the device. The system can then receive data from the sensing apparatus that indicates a location of a fixed vision focus of a user and determine the location of the fixed vision focus of the first user. The system can then send the message to the second device. The second device can be configured to use rapid serial visual presentation.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer systems, more particular aspects relate to delivery messages in environments using computer systems. While the present disclosure is not necessarily limited to such applications, various aspects of the disclosure may be appreciated through a discussion of various examples using this context.

According to embodiments, the disclosed system can recognize a person with a device in a room and deliver the person a notification to his device, alerting him to the receipt of a message. This could be a vibration or other non-visual notification, though visual displays could also or alternatively be used. The person can then purposely look up at an auxiliary device, like a screen mounted on a wall in the room. The room may be equipped with sensors that can then detect where the person is looking, and identify device such as a screen or other display closest to the person's fixed visual focus. The system can then send the message to the device to display the message. The surface may be configured to use rapid serial visual presentation (RSVP) technology to display the message.

Figure 1:
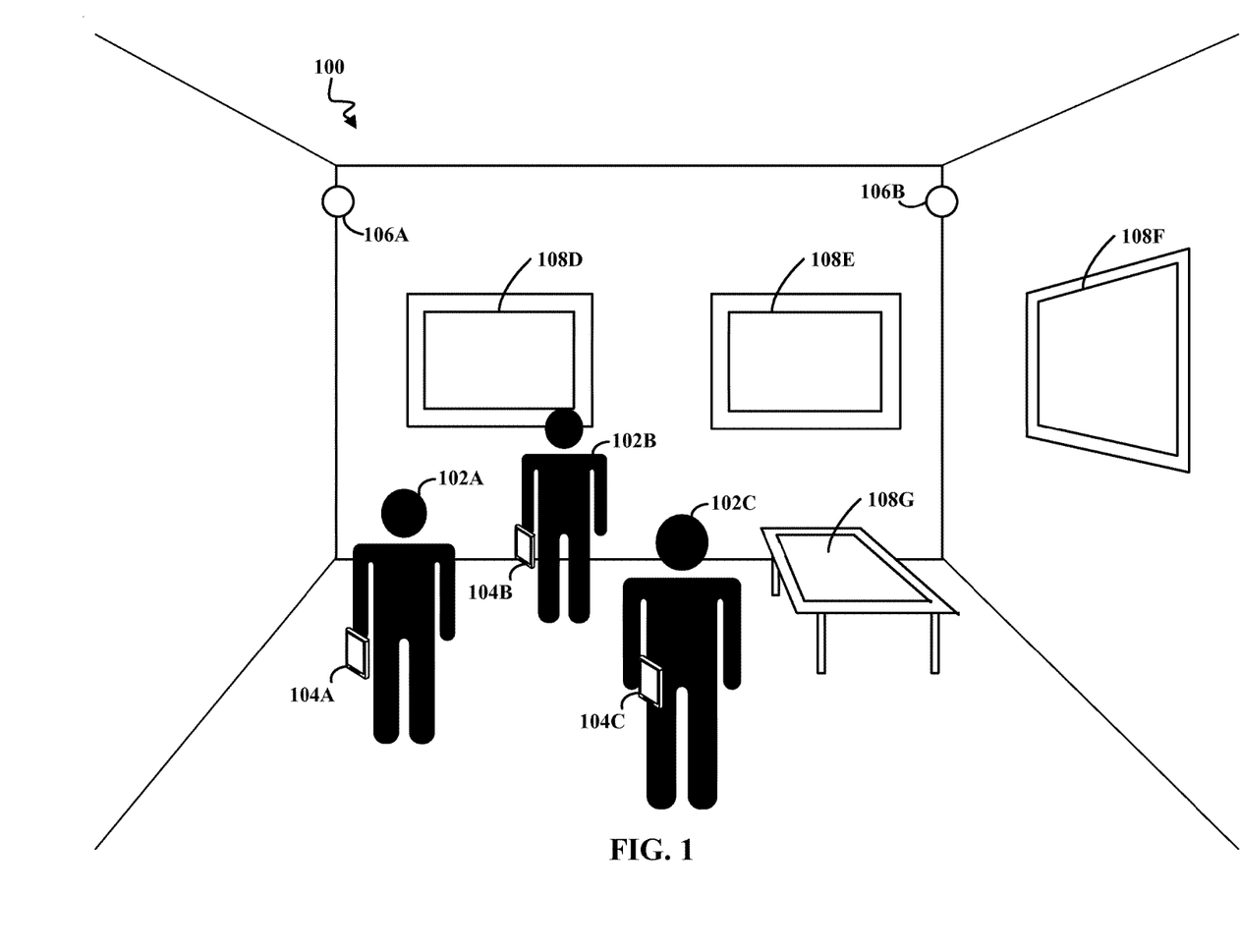
FIG. 1 depicts an environment equipped to deliver a private message to a user, consistent with embodiments.

FIG. 1 depicts an example environment 100 equipped to deliver a private message to a user, consistent with embodiments. The environment 100 may be an environment such as a shared research laboratory, a coffee shop, a conference room, or another environment. The environment 100 may be equipped with at least one display 108. As used herein, a display can be any device configured to display a message. Each display 108 may be a screen or monitor affixed to or a part of a wall, per displays 108D, 108E, and 108F. A display 108 may also be a part of or affixed to a top surface of a table, per 108G. A display 108 could also be any other surface suitable for delivering a message using rapid serial visual presentation (RSVP) technologies.

The environment 100 may contain one or more users 102, with each user 102A, 102B, and 102C carrying a mobile device 104A, 104B, and 104C, respectively. The mobile device 104 may be a wireless enabled cellular phone, a personal computing device, or any other device capable of receiving messages and connecting with a computer system over a network. It is assumed that a device 104 is turned on and able to connect with the system over a network. This connecting or "pairing" may occur automatically, upon entry to the environment 100. For example, the system could maintain a database of profiles associated with a particular device 104, and in this way recognize the device upon the entry of the user 102 and associated device 104 into the environment 100. The pairing could also occur based on a predetermined user setting, which grants permission to the system to pair with the device. The system could also prompt the user's device 104 for permission to connect upon entering the environment 100. The device could connect in other ways; for purposes of this disclosure it is assumed that any necessary permission has been granted and the device is available to connect with the system.

The environment 100 may also be equipped with one or more sensors comprising pieces of sensing apparatus 106. The sensors or pieces of sensing apparatus 106A and 106B may comprise a plurality of cameras, depth sensors, or other sensing devices capable of detecting users or the location of a user's fixed visual focus in the room. The location of a fixed visual focus of a user can be a location where a user is looking, either for a brief or extended period of time. The environment 100 may be equipped with a single sensing apparatus. The environment may be equipped with a network comprising a plurality of sensors. The sensing apparatus 106 may detect the location of a user's fixed visual focus. The sensing apparatus 106 could also serve to identify users, and similar to the device profiles, the system could maintain a database of user profiles, based on, for example, facial recognition technology. In this way, the system could recognize both users 102 and devices 104, and develop profiles for each, in order to learn and better understand preferences for each user 102. For example, the system could learn a user's preferred manner of notifying for a particular device, and in this way could use this manner of notifying (e.g., vibration, sender identification information only, message subject only, etc.) when communicating with the user's device. The sensing apparatus 106 can then send this data to the computer system. The sensing apparatus 106 could send data including the location of the user's fixed visual focus, an identity of a user, a stream of images it captures (from e.g., a video camera), or other data.

Figure 2:
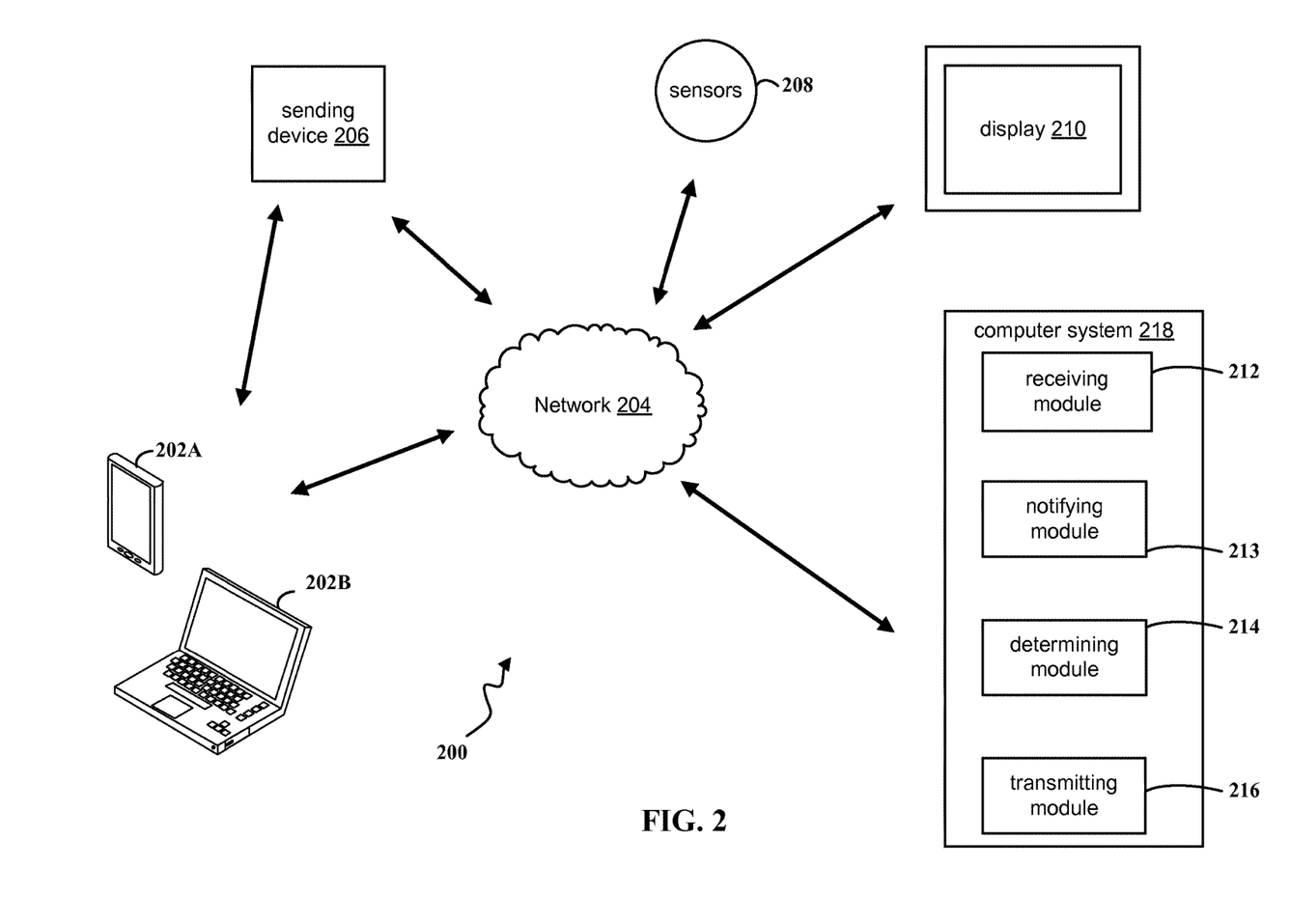
FIG. 2 depicts a system diagram for communicating a private message to a user in an environment, consistent with embodiments.

FIG. 2 depicts a system 200 for communicating a private message to a user in an environment, consistent with embodiments. The system 200 depicted in FIG. 2 can be carried out on various computer processing circuits, and may comprise the various modules described herein, or may comprise fewer or additional modules. A device 202 receiving the private message may be a smart phone, laptop, or another processing hardware device. Examples of a device are depicted by the images 202A and 202B. The device may receive the message from a sending device 206. This sending device 206 may be a cell phone server, another smart phone, laptop, email web server, or another device. The receiving device 202 may receive the message from the sending device 206 over a network 204 or in another manner.

In embodiments, when the receiving device 202 (hereafter "the device") enters an environment (e.g., the environment 100 of FIG. 1), a computer system 218 can connect with the device 202 over one or more networks 204. The networks can include, but are not limited to, local area networks, point-to-point communications, wide area networks, the global Internet, and combinations thereof.

In embodiments, once a device 202 connects with or "pairs" with the computer system 218, the receiving module 212 can then receive messages intended for the device 202. The receiving module 212 can receive the messages from the device 202 itself over the network 204, or the receiving module 212 can receive a message directed to the device 202. The notifying module 213 of the computer system 218 can then notify the device 202 that the message has been received (i.e., that the system 218 has received a message directed to the device 202). The notifying can include delivering the message in its entirety to the device 202. The notifying can also include delivering only the identity of the sender of the message to the device 202. The notifying can also include delivering the identifying information regarding the sender as well as a subject of the message to the device 202. The notifying could also include other variations, which could be controlled by user settings or informed by past behavior or other profile data.

In response to the notifying, the user could select an "ignore" option for the message or a "remind me later" option, via the device 202. In response to receiving one of these options or others similar which could communicate a denial of the message delivery at that particular time, the computer system 218 could deliver the message at a later time. This time could be based on a preconfigured setting, it could be based on user input at the time of the denial, or it could be based on another factor.

The determining module 214 of the computer system 218 can then receive data from the one or more sensors 208, to determine the location of the user's fixed visual focus. The determining module 214 can receive data from the sensors that includes only the location of the user's fixed visual focus. The determining module 214 could also receive data including a stream of images captured by a sensing device, and from the data, it could determine the location of the user's fixed visual focus. Based on the location of the fixed visual focus of the user (the user possessing the device 202 of interest), the transmitting module 216 can send the message to the display 210 over the network 204.

In embodiments, the display 210 can display the message to the user using RSVP technology. The display 210 can also display only the identifying information regarding the sender or subject of the message, and based on a setting, the user—through his or her device 202—can determine whether or not the entire message should be displayed on the display 210.

Figure 3:
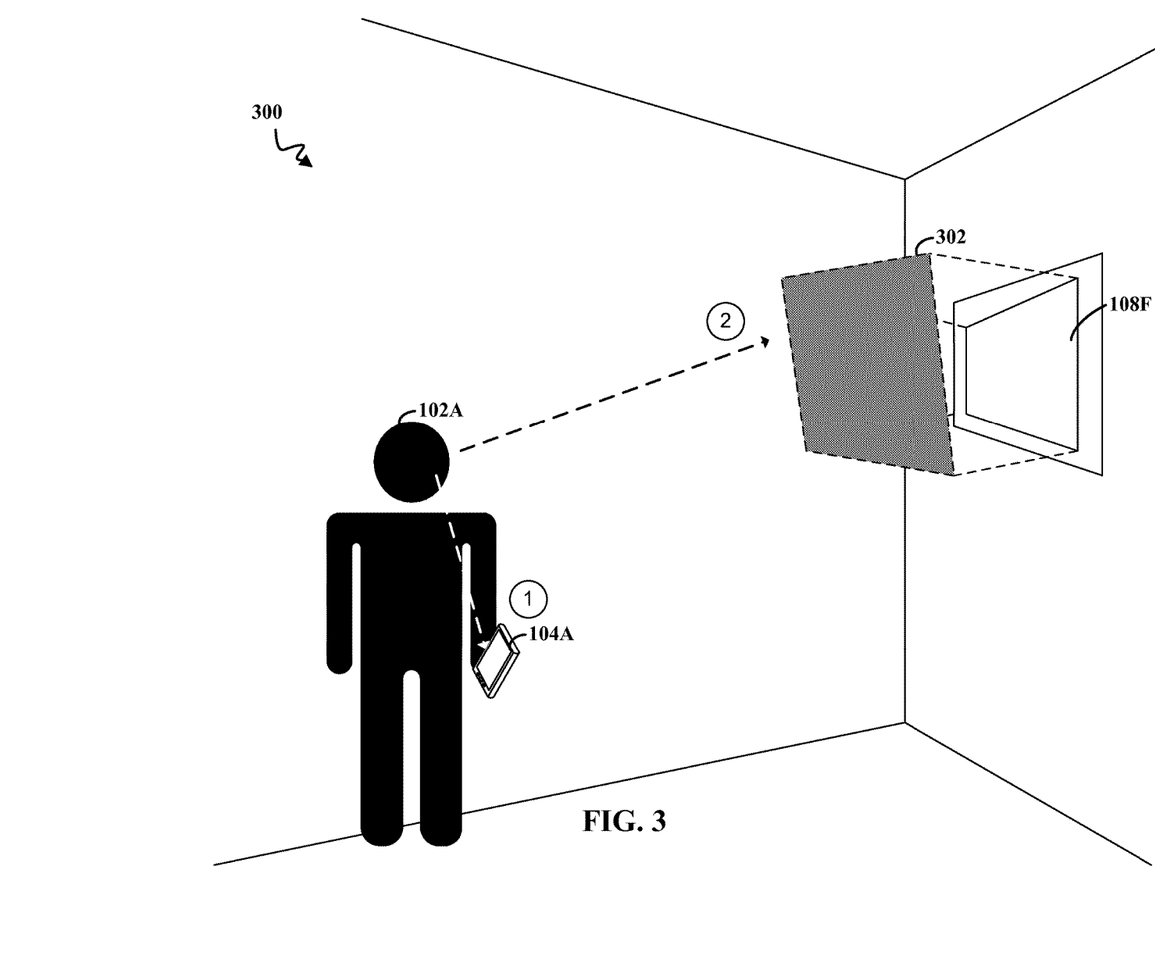
FIG. 3 depicts an environment to deliver a message using rapid serial visual presentation, consistent with embodiments.

FIG. 3 depicts an environment to deliver a message using rapid serial visual presentation, consistent with embodiments. The environment 300 may be similar to the environment 100 shown in FIG. 1. User 102A and device 104A in FIG. 3 could be the same user 102A and device 104A from FIG. 1. Here, the user 102A has her device 104A in view (e.g., in her hand). A user 102A may also have a device in a pocket or otherwise out of view. In order for the device 104A to be associated with the user 102A, the device 104A may be able to communicate or notify the user 102A, via a vibration mode or in another manner (i.e., not necessarily using visual display). In this way, a user 102A can be alerted to a message without disturbing those around her.

As indicated by ①, the user 102A may be alerted to an incoming message (in the manner discussed above, or another way), and may receive the alert (e.g., by looking down at the device 104A in this case). Based on the alert, the user 102A may then look up toward a display 108F, as indicated by ②. As discussed herein, the computer system may receive data from the sensors in the environment, the data indicating the location of the user's fixed visual focus. The data could indicate the location by identifying the location. The data could also indicate the location by supplying images to the system for analysis. For example, the determining module 214 (FIG. 2) could receive image data from the sensors and determine, from the data, the location of the user's fixed visual focus. Thus, in response to the user 102A looking up at the display 108F, the message can be displayed via particular display 108F, using RSVP. As illustrated here, the message may be projected per 302, and displayed virtually off of the display 108F. The message could also be displayed directly on the display 108F, if for example, the display 108F were a screen capable of using RSVP technology.

Figure 4A:
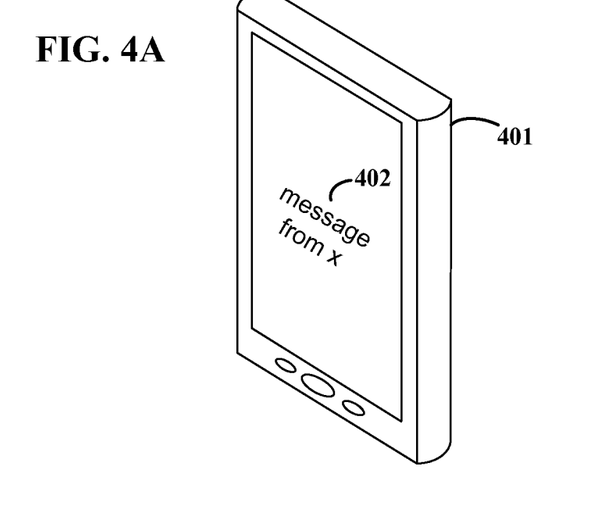
FIG. 4A depicts a device for receiving a message, consistent with embodiments.

FIG. 4A depicts a device 401 for receiving a notification, consistent with embodiments. The device pictured could be a device from 104 from FIG. 1. The screen shows an example of a notification 402 that could be received by the user's device. As discussed herein, the notification could be identifying information regarding the sender of the message (as pictured at 402), the subject of the message, a first line of the message, or simply a vibration or sound with no visual notification.

In some embodiments, the notifying may be considered inherent to the receiving step. For example, when the system receives the message, the user device could receive a notification indicating the receipt of the message. This could include a vibration or a subject of the message. The notification could also include receiving identifying information about the identity or location of the sender of the message.

Figure 4B:
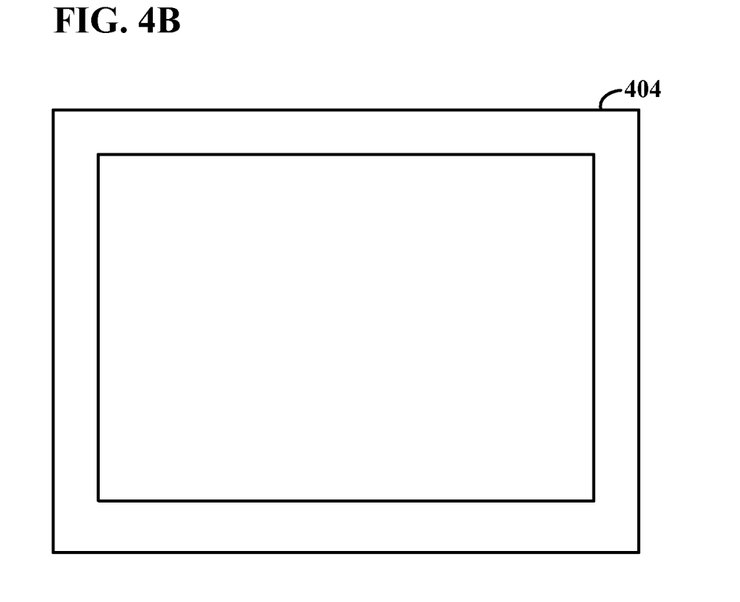
FIG. 4B depicts a device for projecting or displaying a message in an environment, consistent with embodiments.

FIG. 4B depicts a device 404 for projecting or displaying a message in an environment, consistent with embodiments. The display may be the same as that pictured in FIG. 1 at 108. The display 404 may be configured to display a message that corresponds to the notification in FIG. 4A. The content of the message shown on the display 404 may be displayed according to embodiments, with the identifying information regarding the sender of the message (from 402) displayed along with the content of the private message itself. Embodiments may also provide for only a portion of the message to be displayed, just the sender information, just a subject of the message, or another variant. Again, the amount of information sent can be controlled by the user or system-controlled settings. These setting can be static, set each time the device pairs with the system, or developed over time based on a machine-learned profile associated with the device or with the user. The display may be configured to use RSVP technology to deliver the message. In this case, a single word or a few short words may flash on the display 404 for a short time, with the next word or words in the message being shown thereafter, until the entire content of the message has been displayed, in a piecemeal fashion, across the display 404.

Figure 5:
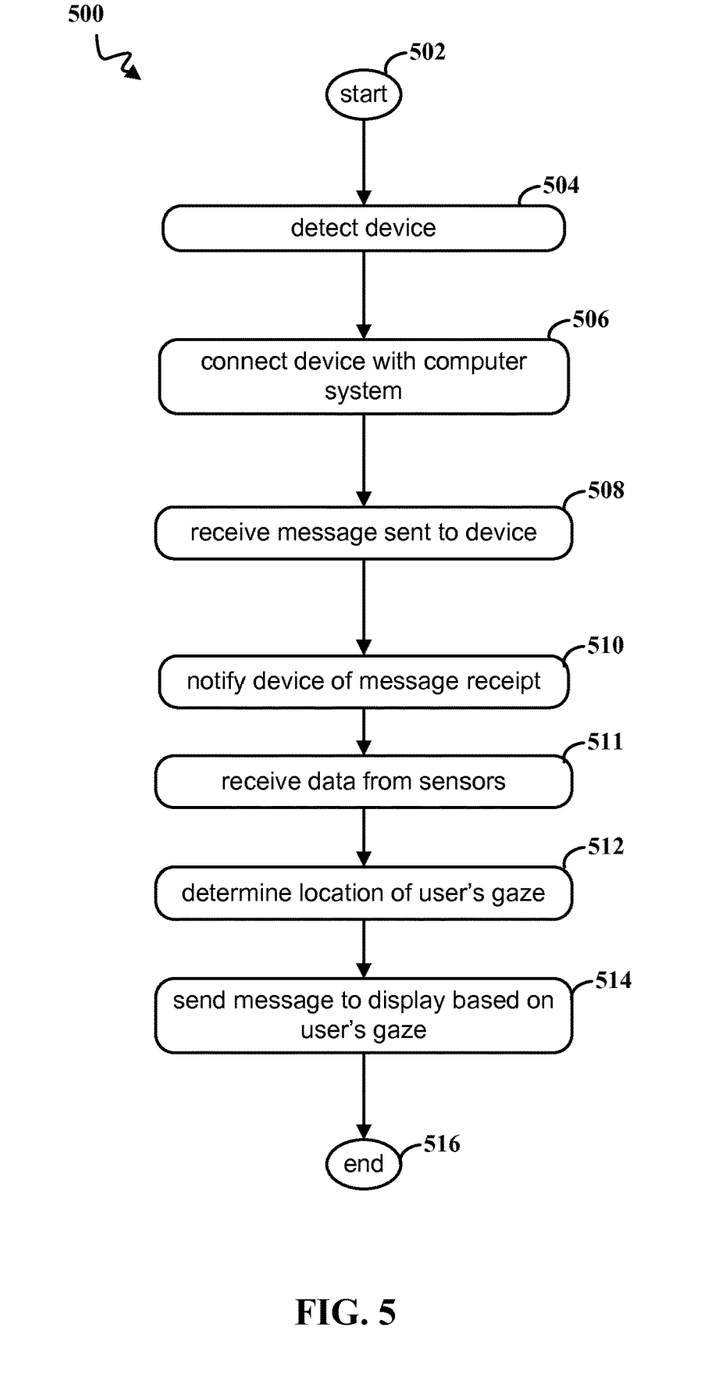
FIG. 5 depicts a flow diagram of a method for delivering a private message in an environment, consistent with embodiments.

FIG. 5 depicts a flow diagram of a method for delivering a private message in an environment, consistent with embodiments. The method for delivering a private message in an environment 500 can start 502 when a computer system associated with the environment detects a device, per 504. The computer system associated with the space can then connect or "pair" with the device, per 506. As described herein, this pairing can occur automatically upon the device entering a particular region associated with the environment. The device could connect with the system based on one or more of any number of settings or permissions and security barriers.

At 508, the system can receive a message that was sent to the device. This can involve intercepting a text message, an email, or another kind of message. In response to receiving the message, the system can notify the device of the message, per 510. The notifying can include causing the device to vibrate or ring, or provide a visual cue on the device's screen, including, for example, the subject of the received message, information regarding the sender of the message, or another text or graphical indication of message receipt. As discussed herein, these notifications, including the type received, can be determined by a user or system controlled setting, or determined by a maintained or machine-learned profile for a device and a user, or a combination of any of the aforementioned.

Upon receipt of the notification, the user may look toward a display. The user may be familiar with the system or may have been previously instructed to look directly at a particular location or display in order to interact with the system as desired and to receive the message. The sensors can capture data about the location of the user's glace and send the data to the computer system. The system can receive that data, per 511, and can then determine the location of the user's fixed visual focus, per 512. The location of the fixed visual focus can be detected by one or more pieces of sensing apparatus that may be installed and activated throughout the environment; the location of the fixed visual focus could also be determined by the computer system from raw data collected by the sensors.

In response to the detection of the user associated with the subject device, the system can send the message to the display, per 514. In embodiments, the display can be the surface on which the user's fixed visual focus is directed. It can also be the surface closest to the fixed visual focus. The display can then either display or project the message, according to descriptions herein, using RSVP technology. In this way, a user can receive a private or semi-private message in an environment, without the disruption from one or more screens intervening between users in an environment.

Figure 6:
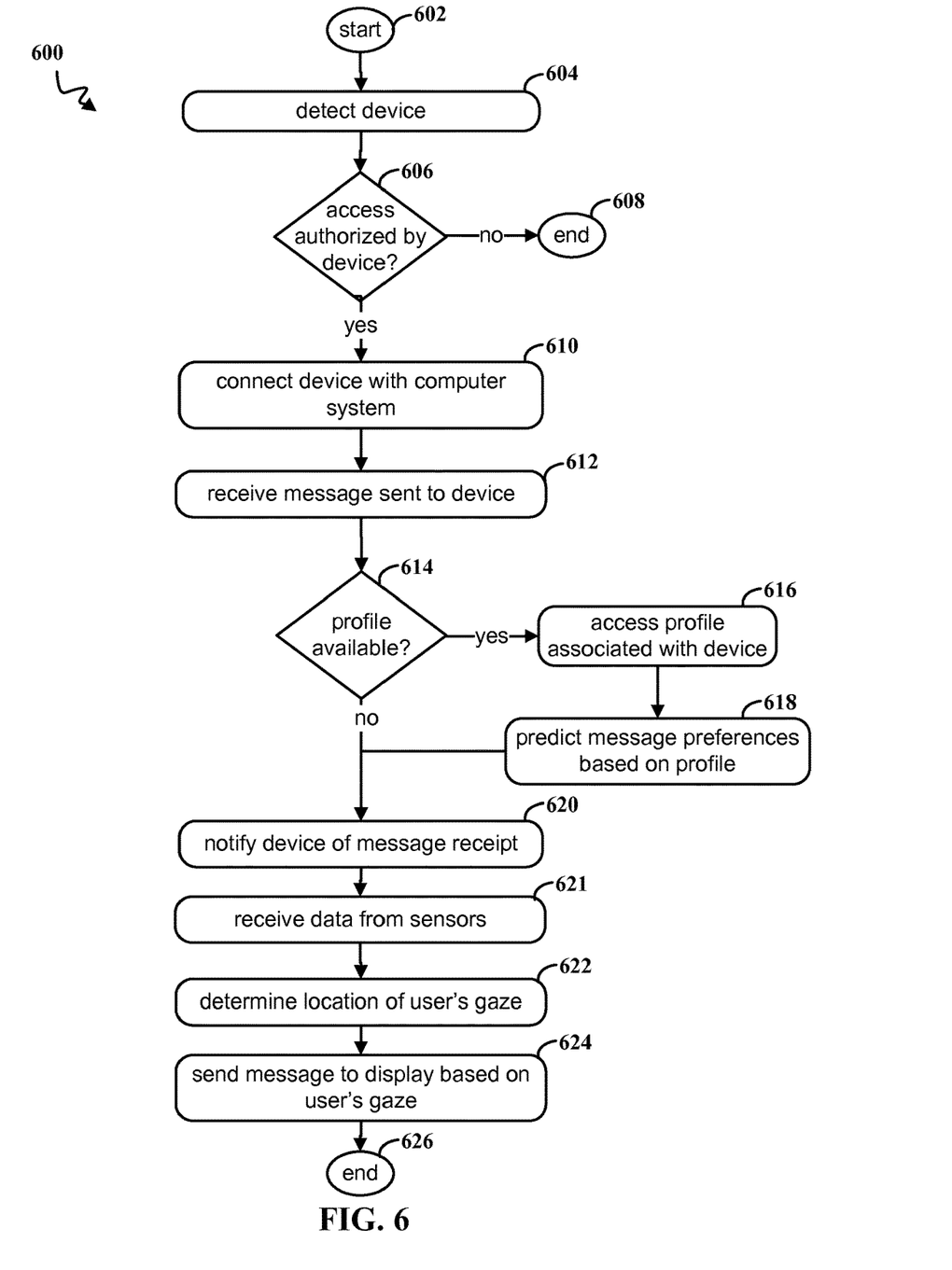
FIG. 6 depicts a method for delivering a private message to a device with a profile in an environment, consistent with embodiments.

FIG. 6 depicts a method for delivering a private message to a device with a profile in an environment, consistent with embodiments. Method 600 shows the steps for delivering a private message in an environment, when a profile is used. In this method, only a profile associated with a device is shown; however, embodiments may involve a system that provides for a profile for each user, in addition to or instead of a profile for each device. The method starts at 602. The system can detect a device, per 604. If the system is authorized to access the device, per 606, the system can connect with the device, per 610. If the system has not been authorized to access the device at 606, the system will ignore the device, and the method will end for that particular device, per 608. It should be noted that in this method, authorization to connect or "pair" with the system is being granted on the device side, but the system, both, or neither may be responsible for authorizing the pairing.

For example, in an office or work laboratory setting, the device may be a company-issued tablet computer. This tablet may come pre-authorized to pair with the system or all systems on company premises. In another example, the environment could be a coffee shop. In this case, the device could be a user's personal mobile device (i.e., smart phone). In this instance, upon entering the coffee shop, the device could prompt the user to grant permission to pair with the coffee shop system. The device could also have an option to "remember" the selection and to grant or deny access automatically, accordingly, in the future. The coffee shop's system could also maintain a database of device profiles, in order to better cater to the user and the device (e.g., if the user is carrying a particular device (e.g., a personal smart phone), the system could automatically connect, but if the user is carrying a different device (e.g., a work laptop with instant messaging), the system could know not to prompt the user to connect.

The system can receive the message sent to the device, per 612. The system can then determine whether a profile is available for the particular device, per 614. As noted herein, there can be a set of profiles created for users interacting with the system, as well, depending in part on the capabilities of the pieces of sensing apparatus. If a profile is available at 614, the system can access the profile associated with the device (that received the message), per 616. If the profile is well-developed, the system can use data in the profile to predict the message preferences, per 618. For example, a profile may contain historical usage data, system or user-entered data, or other data. A particular profile may indicate that a particular device has a vibration capability, and that this is the notification type the device has used in nearly every instance in the past. Thus, the system may then notify the device of message receipt, per 620, using vibration and no other notification.

Based on the vibration, the user could then look up at a device to display the message. For example, the user may be in a conference room listening to a presentation. Upon notification, the user could look to a device on the back wall of the room, in order to minimize distraction. Sensors in the room could be used by the system to detect the location of the user's fixed visual focus and that data could be sent to the system. The computer system could receive the data from the sensors, per 621, and the system could determine the location of the user's fixed visual focus from the data, per 622.

In response to the determining, the system can send the message to a display in close proximity to the user's fixed visual focus, per 624. In this way, the system can display the message using RSVP technology, to the user in an environment. Once the message has been sent to the device configured to display the message using RSVP, the method can end, per 626.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
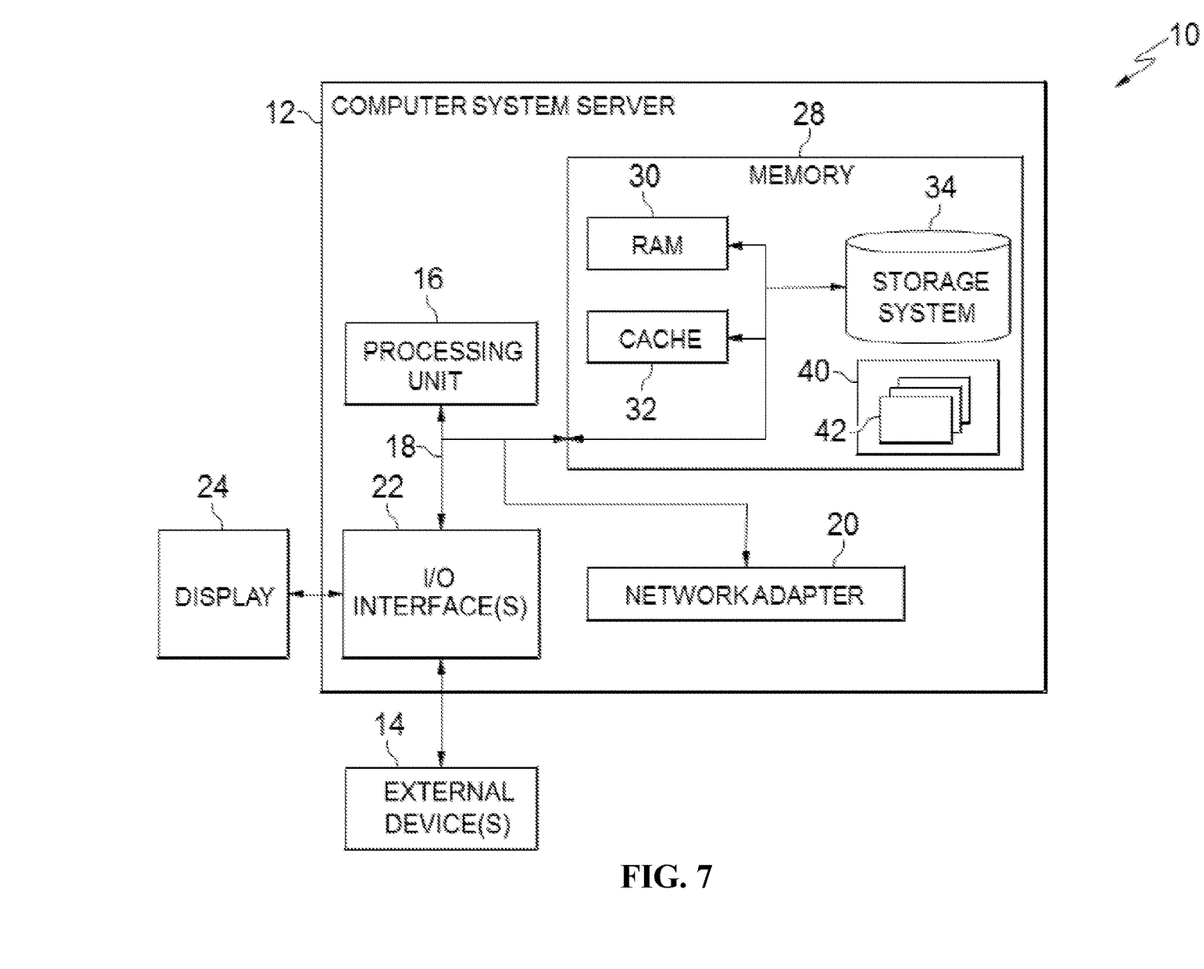
FIG. 7 depicts a cloud computing node consistent with embodiments.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 8:
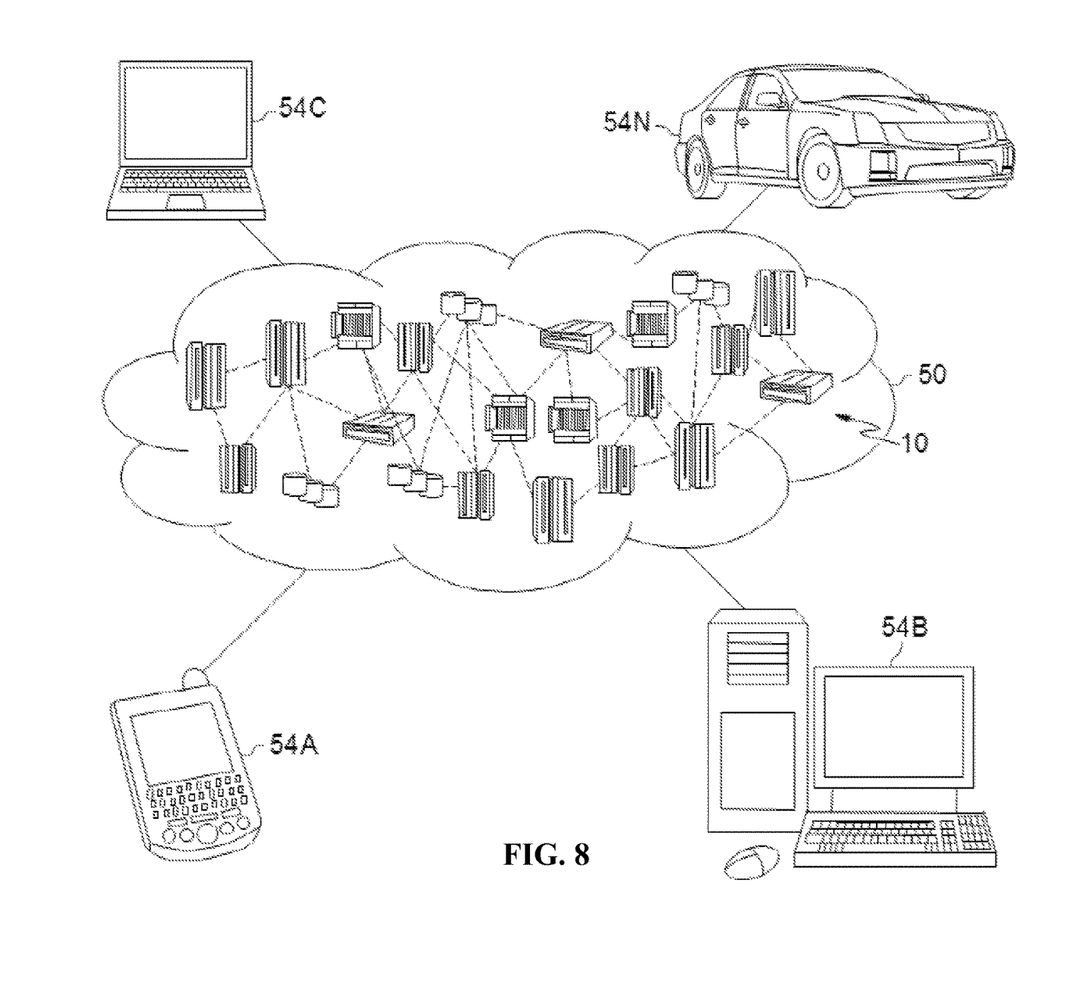
FIG. 8 depicts a cloud computing environment consistent with embodiments.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
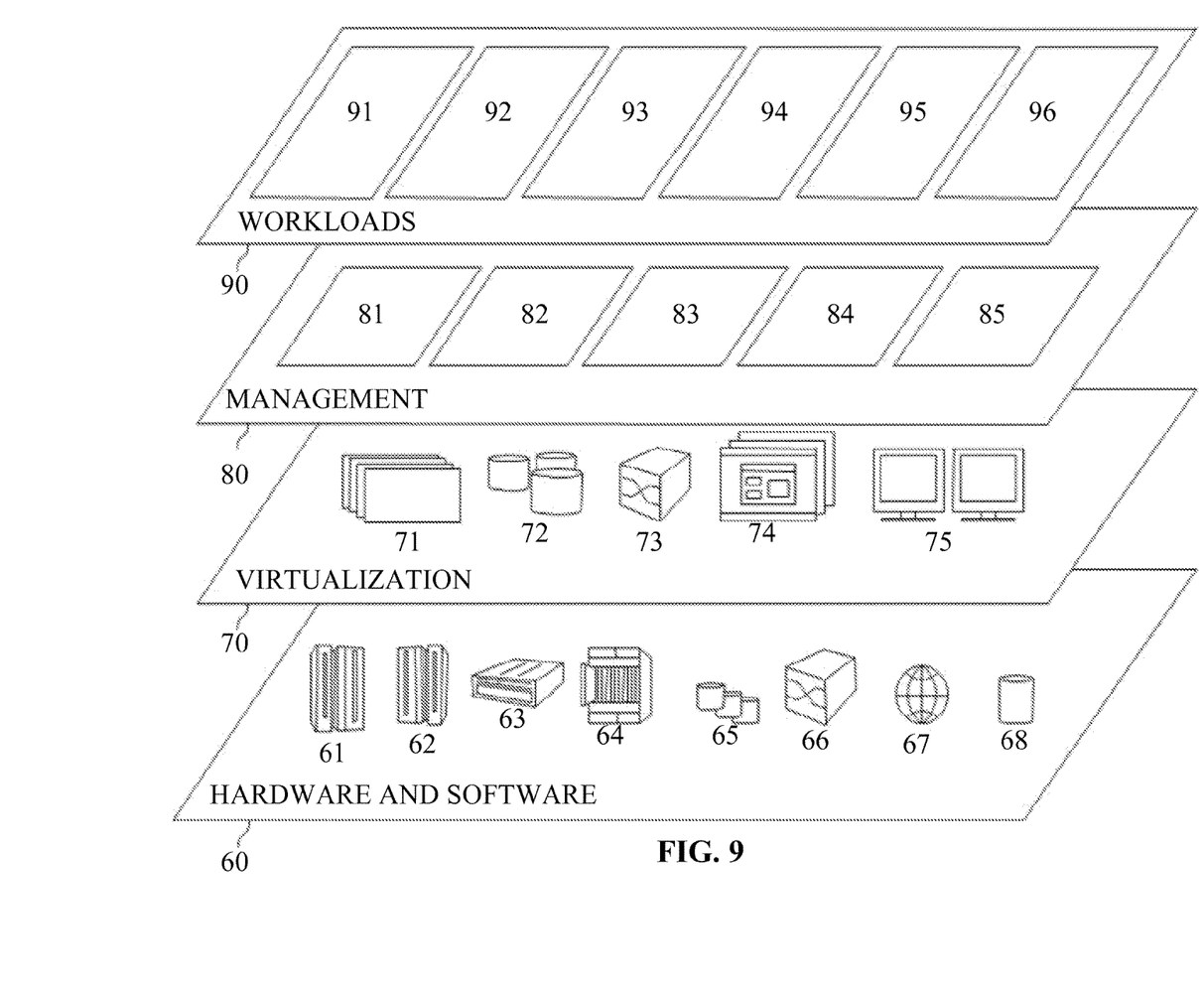
FIG. 9 depicts abstraction model layers consistent with embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and delivering private messages to users in environments 96.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for delivering a private message to one or more users, wherein the one or more users are associated with a network enabled device in an environment, wherein the environment is equipped with a sensing apparatus and a second device, the method comprising:
   detecting, by a computer system, a first device associated with a first user is in the environment, wherein the computer system is associated with a shared environment, wherein the shared environment is accessible to the one or more users;
   receiving, responsive to the detecting and from the first device, permission to connect with the computer system for the shared environment;
   connecting, in response to receiving permission from the first device, the first device to the computer system;
   receiving, by the computer system, the private message directed to the first device, wherein the private message comprises a set of data including sender data and content data;
   receiving data from the sensing apparatus, wherein the data indicates a location of a fixed visual focus of the first user;
   determining, by the computer system and from the data, the location of the fixed visual focus of the first user;
   determining, based on a profile associated with the first device, a user-defined set of data from the message to be displayed on the second device; and
   sending, based on the location of the fixed visual focus of the first user, the message to the second device, the second device configured to use rapid serial visual presentation (RSVP), and wherein the second device is associated with the shared environment and is displayed in the shared environment.

2. The method of claim 1, further comprising:
   accessing, in response to the receiving the message, a profile associated with the first device, the profile comprising historical usage data;
   determining, based on the profile associated with the first device, a preferred manner of receiving the private message, wherein the receiving the private message occurs in the preferred manner.

3. The method of claim 2, wherein the preferred manner of receiving the private message comprises receiving identifying information about the location of a sender of the private message.

4. The method of claim 1, wherein the receiving the private message comprises causing the first device to vibrate.

5. The method of claim 1, wherein the second device is further configured to display identifying information about a sender of the message.

6. The method of claim 1, wherein the determining, based on the profile associated with the first device, further comprises determining a method of notification for the message.

7. The method of claim 6, wherein the method of notification for the message is a non-audible notification.

8. A computer system for delivering a private message to one or more users, wherein the one or more users are associated with a network enabled device in an environment, wherein the environment is equipped with a sensing apparatus and a second device, the system comprising:
at least one computer processor circuit comprising:
a receiving module configured to:
detect a first device associated with a first user in the environment, wherein the computer system is associated with a shared environment, wherein the shared environment is accessible to the one or more users;
receive, responsive to the detection and from the first device, permission to connect with the computer system for the shared environment;
connect, in response to the receiving permission from the first device, the first device to the computer system; and
receive the private message directed to the first device, wherein the private message comprises a set of data including sender data and content data;
a determining module configured to:
receive data from the sensing apparatus, wherein the data indicates a location of a fixed visual focus of the first user;
determine, from the data, the location of the fixed visual focus of the first user;
determining, based on a profile associated with the first device, a user-defined set of data from the message to be displayed on the second device; and
a transmitting module configured to:
send, based on the location of the fixed visual focus of the first user, the message to the second device, the second device configured to use rapid serial visual presentation (RSVP), and wherein the second device is associated with the public space and is displayed in the shared environment.

9. The computer system of claim 8, wherein the circuit is further configured to include:
the receiving module further configured to:
access, in response to the receiving the message, a profile associated with the first device, the profile comprising historical usage data;
receive, by the computer system, the private message directed to the first device; and
determine, based on the profile associated with the first device, a preferred manner of receiving the private message, wherein the receiving the private message occurs in the preferred manner.

10. The computer system of claim 9, wherein the preferred manner of receiving the private message comprises receiving identifying information about the location of a sender of the private message.

11. The computer system of claim 8, wherein the receiving module is further configured notify, in response to the receiving, the first device that the message has been received by causing the device to vibrate.

12. The computer system of claim 8, wherein the second device is further configured to display identifying information about a sender of the message.

13. The system of claim 8, wherein the determining module is further configured to: determine, based on the profile associated with the first device, a method of notification for the message.

14. The system of claim 13, wherein the method of notification for the message is a non-audible notification.

15. A computer program product for delivering a private message to one or more users, wherein the one or more users are associated with a network enabled device in an environment, wherein the environment is equipped with a sensing apparatus and a second device, the computer program product comprising a computer readable storage medium having program instructions embodied therewith, wherein the computer readable storage medium is not a transitory signal per se, the program instructions executable by a computer processing circuit to cause the circuit to perform the method comprising:
detecting, by a computer system, a first device associated with a first user in the environment, wherein the computer system is associated with a shared environment, wherein the shared environment is accessible to the one or more users
receiving, responsive to the detecting and from the first device, permission to connect with the computer system for the shared environment;
connecting, in response to the receiving permission from the first device, the first device to the computer system;
receiving, by the computer system, the private message directed to the first device, wherein the private message comprises a set of data including sender data and content data;
receiving data from the sensing apparatus, wherein the data indicates a location of a fixed visual focus of the first user;
determining, by the computer system and from the data, the location of the fixed visual focus of the first user;
determining, based on a profile associated with the first device, a user-defined set of data from the message to be displayed on the second device; and
sending, based on the location of the fixed visual focus of the first user, the message to the second device, the second device configured to use rapid serial visual presentation (RSVP), and wherein the second device is associated with the public space and is displayed in the shared environment.

16. The computer program product of claim 15, wherein the method further comprises:
accessing, in response to the receiving the message, a profile associated with the first device, the profile comprising historical usage data;
determining, based on the profile associated with the first device, a preferred manner of receiving the private message, wherein the receiving the private message occurs in the preferred manner.

17. The computer program product of claim 16, wherein the preferred manner of receiving the private message comprises receiving identifying information about the location of a sender of the private message.

18. The computer program product of claim 15, wherein the receiving the private message comprises causing the first device to vibrate.

19. The computer program product of claim 15, wherein the determining, based on the profile associated with the first device, further comprises determining a method of notification for the message.

20. The computer program product of claim 19, wherein the method of notification for the message is a non-audible notification.

* * * * *